(12) United States Patent
Yamamoto

(10) Patent No.: US 6,176,355 B1
(45) Date of Patent: Jan. 23, 2001

(54) EDDY CURRENT BRAKING SYSTEM

(75) Inventor: Yasushi Yamamoto, Kanagawa (JP)

(73) Assignee: Isuzu Motors Limited (JP)

(*) Notice: Under 35 U.S.C. 154(b), the term of this patent shall be extended for 0 days.

(21) Appl. No.: 09/280,441

(22) Filed: Mar. 29, 1999

(30) Foreign Application Priority Data

Mar. 30, 1998 (JP) .................................................. 10-102016

(51) Int. Cl.⁷ .................................................... F16F 15/03
(52) U.S. Cl. .......................... 188/267; 188/158; 188/161; 310/93
(58) Field of Search .................................. 188/267, 158, 188/159, 161, 164; 310/93, 105

(56) References Cited

U.S. PATENT DOCUMENTS 4,567,963 * 2/1986 Sugimoto ............................. 182/236
5,303,802   4/1994 Kuwahara .
5,650,679 * 7/1997 Boggs, III et al. .................. 310/105
6,039,157 * 3/2000 Yamada et al. ...................... 188/158

* cited by examiner

Primary Examiner—Douglas C. Butler
Assistant Examiner—Pamela J. Rodriguez
(74) Attorney, Agent, or Firm—John E. Toupal; Harold G. Jarcho

(57) ABSTRACT

A vehicle braking system including a magnetically permeable rotatably mounted brake drum; an annularly distributed magnetic source generates a magnetic field within the brake drum; a control for selectively applying the magnetic field to the brake drum; a drive shaft rotatable during movement of the vehicle; and a rotational speed enhancing coupling between the brake drum and the drive shaft.

20 Claims, 4 Drawing Sheets

EDDY CURRENT BRAKING SYSTEM

BACKGROUND OF THE INVENTION

The present invention principally relates to a magnet type, eddy current reduction braking system for assisting frictional brakes in large vehicles.

According to a generator type reduction apparatus (retarder) disclosed in Japanese Patent Application Laid-Open No. 60-255050 Publication, an annular stator body supports a field coil of an induction type generator and is rotated in a direction oppositely to an annular rotor body which supports an armature coil of the induction type generator. The resultant increase in the relative number of revolutions of the annular rotor body with respect to the annular stator body enhances braking performance. Braking energy is recovered as an electric power which is converted into and disposed of as heat in a load resistor or the like. Therefore, braking performance is not reduced by heat generation in the annular rotor body.

However, even if the above-described reversing mechanism is applied to a magnet type eddy current reduction braking system such that a magnet support tube is rotated in a direction reversed to that of a brake drum, cooling performance is not enhanced because the absolute number of brake drum revolutions remain unchanged. Furthermore, since the relative number of revolutions of the brake drum and the magnet support tube increases, braking performance is diminished substantially by increased heat generation in the brake drum.

In conventional magnet type eddy current reduction apparatus, rotational energy of a brake drum is converted into and disposed of as heat produced by eddy currents. However, at present, braking performance achieved is inferior to other reduction systems, particularly fluid type reduction systems.

The braking performance of a magnet type eddy current reduction apparatus is proportional to the magnetic force provided by the magnets, the diamater of the brake drum, and the rotational speed of the brake drum, and is different depending on the material used for the brake drum. However, the diameter of the brake drum is restricted by available space in the vehicle, and the rotational speed of the brake drum is controlled by the rotational speed of a drive shaft to which the brake drum is coupled. Braking performance is enhanced, therefore, only by increasing magnetic strength of the magnets or selection of a different material for the brake drum. However, when braking performance is enhanced, heat generation in the brake drum increases, and is not readily dissipated by cooling fins thereby compromising braking performance improvement. Thus, braking performance cannot be effectively enhanced unless heat transfer out of the brake drum is increased.

The object of the present invention, therefore, is to provide an improved magnet type eddy current reduction apparatus capable of enhanced braking performance.

SUMMARY OF THE INVENTION

The present invention is a braking apparatus in which a magnetic field generation system generates eddy currents in a brake drum to provide braking force. In addition, a coupling mechanism increases rotational speed of the brake drum relative to that of an associated drive shaft. The coupling can consist, for example, of a gear mechanism interposed between the drive shaft and the brake drum. For example, the peripheral speed of the brake drum is increased by about two times that provided by the prior art, and, therefore braking torque caused by eddy currents increased to two times the torque provided by conventional apparatus. Since braking torque generated by the brake drum is enhanced about two times, braking torque received by the drive shaft is increased about 4 times. Although heat generated in the brake drum also increases, rotational speed of cooling fins on the brake drum also is doubled to increase cooling efficiency. Consequently, the present invention produces greater braking torque than that provided by conventional magnet type eddy current reduction systems.

BRIEF DESCRIPTION OF THE DRAWINGS

These and other objects and features of the invention will become more apparent upon a persual of the following description taken in conjunction with the accompanying drawings wherein.

DESCRIPTION OF THE PREFERRED EMBODIMENTS

Figure 1:
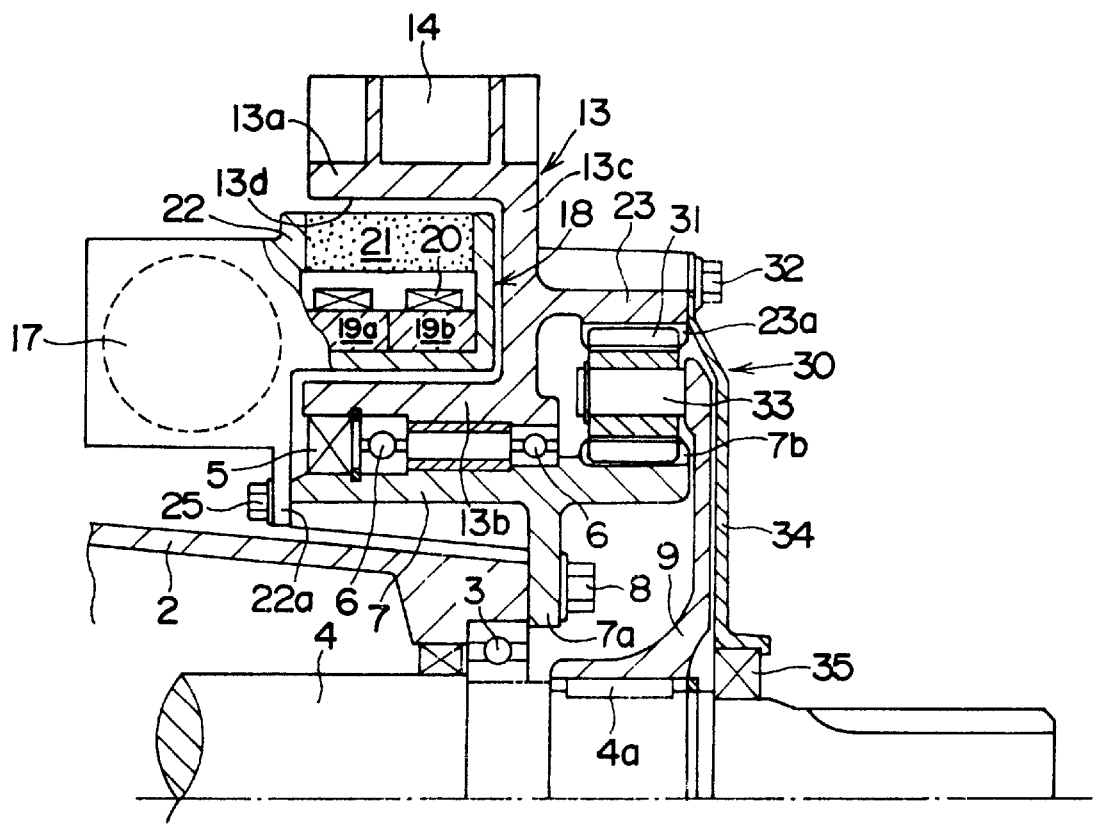
FIG. 1 is a side sectional view of a magnet type eddy current reduction braking system according to a first embodiment of the present invention.

A magnetically permeable, rotatably mounted brake drum 13 having a C-shape in section is coupled by a coupling mechanism 30 to a rotational drive shaft 4 of a vehicle (not shown). A guide tube 18 formed of a non-magnetically permeable material such as aluminum is disposed interiorly of the brake drum 13, and magnet support tubes 19*a* and 19*b* are housed in a hollow portion of the guide tube 18.

Formed on an inner peripheral wall of a fixed tube 7 is an annular plate 7*a* secured by bolts 8 to an end wall of a gearbox 2 of a speed change gear for the vehicle. An inner tubular wall portion 13*b* of the brake drum 13 is rotatably supported by a pair of bearings 6 on a left half portion of the fixed tube 7. Integrally formed on the outer peripheral surface of a right half portion of the fixed tube 7 is a sun gear 7*b*. The inner ends of the tube portion 13*b* and the fixed tube 7 are sealed by means of a seal member 5. Projecting outwardly from an intermediate portion of a right end wall 13*c* of the brake drum 13 is an integrally formed cylindrical portion 23 defining, on an inner peripheral portion, a ring gear 23*a* which engages the sun gear 7*b*. Preferably, a plurality of radial openings for cooling are provided in the outwardly extended cylindrical portion 23 of the brake drum 13.

Boss portions of a plurality of radially extending arms 9 are coupled by keys 4*a* to an outer end of the output rotational shaft 4 which are supported by bearings 3 on an end wall of the gear box 2. A planetary gear 31 is rotatably supported on support shafts 33 at outer ends of the arms 9. The planetary gears 31 are meshed with the ring gear 23*a* and the sun gear 7*b* to thereby constitute the coupling mechanism 30. Closing the coupling mechanism 30 is a cover plate 34 fixed to the cylindrical portion 23 by a plurality of bolts 32. An inner edge of the cover plate 34 is sealed to the rotational shaft 4 by a seal member 35. In response to rotation of the drive shaft 4 at a given speed, the coupling mechanism 30 rotates the brake drum 13 at a greater speed of, for example, twice the given speed.

A number of cooling fins 14 are provided at equal intervals on an outer peripheral wall of the brake drum 13 and a guide tube 18 having a hollow portion of rectangular shape in section is coaxially disposed within the brake drum 13. The guide tube 18 is formed of a non-magnetically permeable material and could be constituted by bonding annular end wall plates to an outer peripheral wall portion 18a (FIG. 2) and an inner peripheral wall portion 18b. However, the illustrated guide tube 18 is formed by fixing a tube portion in the form of a channel or C-shape in section to a left-hand end wall plate 22 with a number of bolts (not shown). A plurality of arms 22a projecting diametrically and inwardly from the end wall plate 22 of the guide tube 18 are secured to an end wall of the fixed tube 7 by a plurality of bolts 25.

Figure 2:
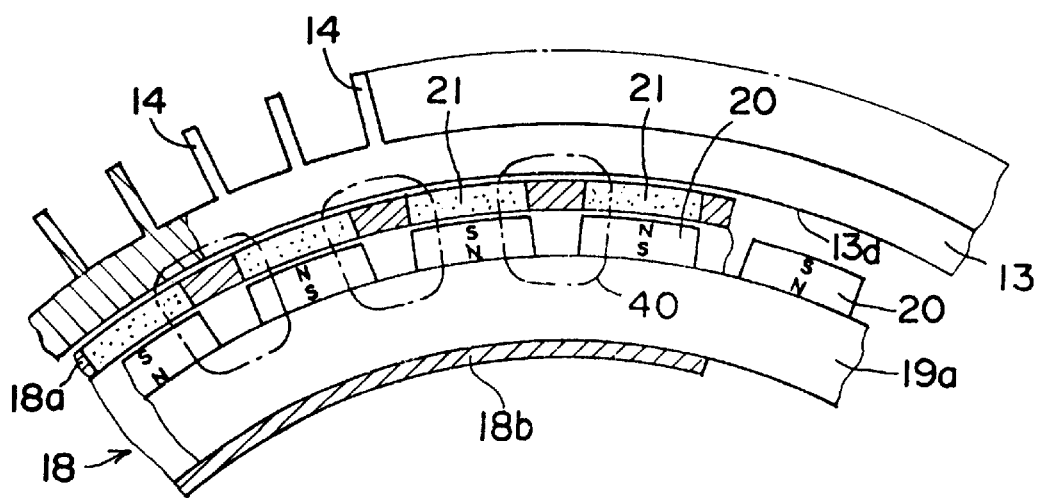
FIG. 2 is a front sectional view of the system shown in FIG. 1.

As shown in FIG. 2, a number of slots are provided at equal circumferentially spaced apart intervals along the outer peripheral wall portion 18a of the guide tube 18. Juxtaposed to an inner peripheral surface 13d of the brake drum 13 are ferromagnetic pole pieces 21, each fitted into and secured to one of the slots. Preferably, the ferromagnetic pole pieces 21 are bonded into the slots when the guide tube 18 is cast of a material such as aluminum.

A movable magnet support tube 19a and transversely adjacent immovable magnet support tube 19b are housed in the hollow portion of the guide tube 18. The magnet support tube 19a is formed of magnetically permeable material and is rotatably supported in the hollow portion of the guide tube 18 while the magnet support tube 19b is fixed therein. Permanent magnets 20 facing the ferromagnetic plates 21 are coupled to the outer peripheral surfaces of each of magnet support tubes 19a and 19b. The polarities of adjacent magnets 20 are opposite both circumferentially and axially.

A plurality of actuators 17 are supported at peripherally equal intervals on the end wall plate 22 of the guide tube 18. Each actuator 17 is conventional with a piston fitted in a cylinder (not shown) to define a pair of fluid pressure chambers. The magnet support tube 19a is connected to an arm (not shown) extending from the piston into the hollow portion of the guide tube 18 via a slit in the end wall plate 22.

In a braking condition shown in FIG. 2, the magnet support tube 19a is rotated by the actuators 17 into a position which radially aligns the magnets 20 with the pole pieces 21. The magnets 20 on the stationary support tube also are radially aligned with the pole pieces 21. In addition, the polarities of the magnets 20 on the magnet support tube 19a and those of transversely adjacent magnets 20 on the magnet support tube 19b are the same. Consequently, magnetic circuits 40 are formed between the magnet support tubes 19a and 19b and the brake drum 13 via the pole pieces 21. As the rotating brake drum 13 crosses the magnetic fields produced by the magnets 20, eddy currents are generated and a braking torque occurs in the brake drum 13. Heat generated by the eddy currents is transferred to the open air through the cooling fins 14.

In a non-braking condition, the magnet support tube 19a is rotated a full pitch into a position in which the polarities of transversely adjacent magnets 20 on the guide tubes 19a and 19b are opposite. Resultant magnetic short circuits are formed between the ferromagnetic plates 21 and the magnet support tubes 19a and 19b. The magnets 20, therefore, cease applying magnetic fields to the brake drum 13 which generates no braking torque.

In the aforementioned embodiment, a description has been made of a magnet type eddy current reduction braking system in which a movable magnet support tube 19a and an immovable magnet support tube 19b are disposed interiorly of a brake drum 13. The movable magnet support tube 19a is rotated to switch between a braking position in which magnets 20 having the same polarities are axially aligned and also radially aligned with the ferromagnetic plates 21 and a non-braking position in which axially aligned magnets 20 on the guide tubes 19a and 19b are of opposite polarity and are radially aligned with the ferromagnetic plates 21. However, the present invention is not limited thereto. For example, the rotational speed enhancing coupling mechanism 30 can be incorporated into other systems to improve braking performance. Examples of such other braking systems are illustrated in FIGS. 3–7.

Figure 3:
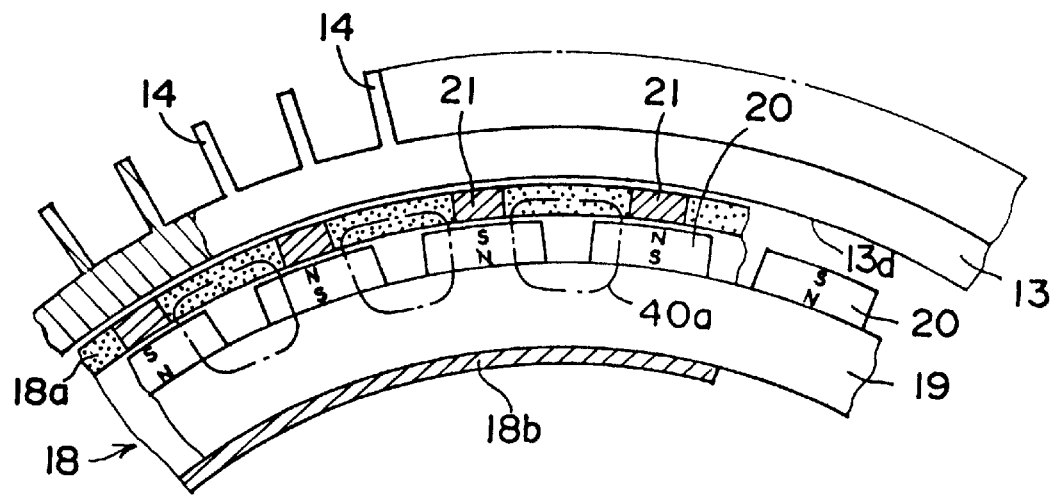
FIG. 3 is a front sectional view of a second embodiment of the invention.

In an embodiment shown in FIG. 3, a single magnet support tube 19 is rotated by a half-pitch of magnets 20 to switch between braking and non-braking conditions. That is, in the braking state, when the magnets 20 of circumferentially alternating polarities are radially aligned with ferromagnetic plates 21, the magnets 20 apply a magnetic field 40 on the brake drum 13 similar to that applied in the above described embodiment (see FIG. 2). Consequently, eddy currents in the rotating brake drum 13 generate a braking torque. Conversely, in a non-braking state shown in FIG. 3, the magnet support tube 19 is rotated a half pitch of the magnets 20 and transversely adjacent magnets 20 each are partly radially aligned with a ferromagnetic plate 21 to create a magnetic short circuit 40a between the magnet support tube 19 and the ferromagnetic plate 21. Accordingly, the magnets 20 fail to apply a magnetic field on the brake drum 13 which generates no braking torque.

Figure 4:
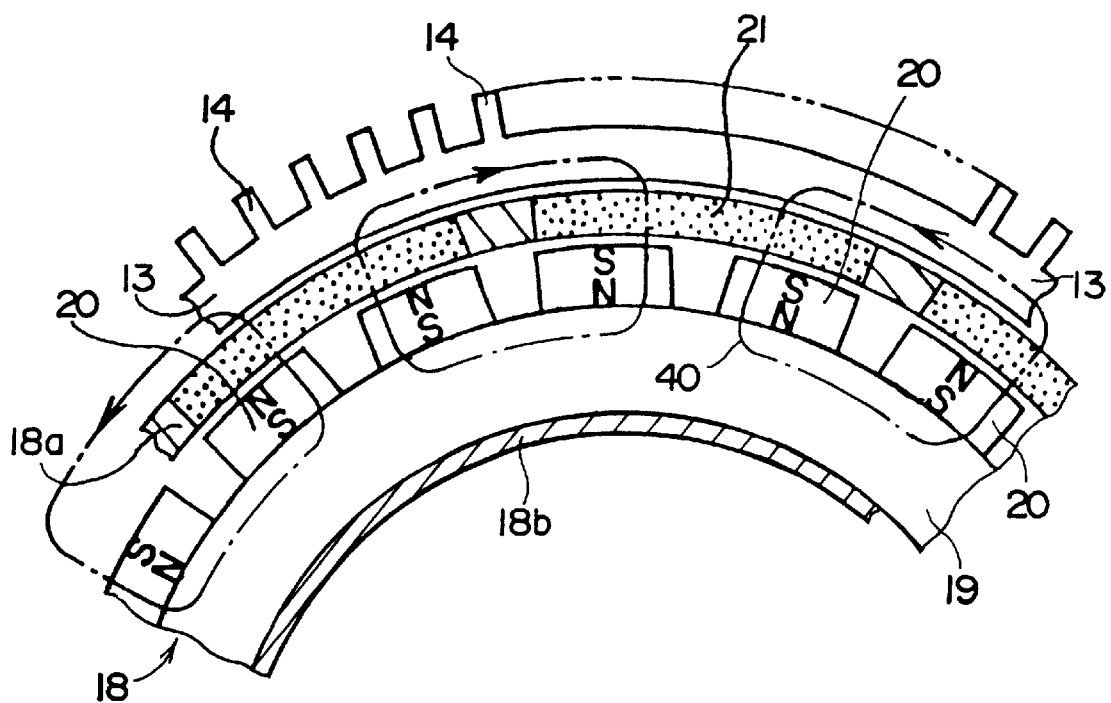
FIG. 4 is a front sectional view of a third embodiment of the invention.

In the embodiment shown in FIG. 4, magnets 20 are distributed at equal intervals to the outer peripheral surface of a single magnetic support tube 19. A pair of same polarity magnets 20 are provided for each ferromagnetic plate 21, and the polarities of the pairs alternate circumferentially. In a braking condition, each pair of magnets 20 having the same polarity are radially aligned with a ferromagnetic plate 21. Consequently, a magnetic circuit 40 is generated between the magnet support tube 19 and the brake drum 13 to produce a braking torque. Conversely, in a non-braking condition, the magnet support tube 19 is rotated by an arrangement pitch of magnets 20 and a pair of magnets 20 having different polarities are radially aligned with each of the ferromagnetic plates 21. A magnetic short circuit therefore is created between the magnet support tube 19 and the ferromagnetic plates 21 and the magnets 20 do not apply a magnetic field to the brake drum 13 which generates no braking torque.

Figure 5:
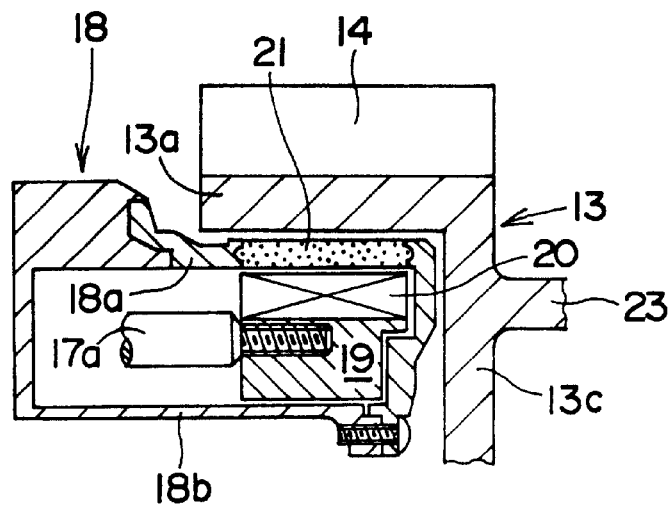
FIG. 5 is a side sectional view of a fourth embodiment of the invention.

In an embodiment shown in FIG. 5, there is provided a magnet support tube 19 which can be moved axially of the brake drum 13 to switch between braking and non-braking conditions. A guide tube 18 formed of a non-magnetically permeable material and having a hollow portion in the form of a rectangle in section is fixed to a non-rotating portion of a vehicle (not shown) so as to face to an inner surface of a brake drum 13. Disposed at equal intervals on an outer peripheral wall portion 18a of the guide tube 18 are a number of ferromagnetic plates 21. The magnet support tube 19 is axially slidably mounted on an inner wall portion 18b of the guide tube 18. Supported on an outer peripheral surface of the magnet support tube 19 and radially aligned with ferromagnetic plates 21 are magnets having circumferentially alternating opposite polarities.

In a braking condition, the magnet support tube 19 is moved into the brake drum 13, as shown in FIG. 5, and the magnets 20 apply magnetic fields to the brake drum 13. When the rotating brake drum 13 crosses the magnetic fields transmitted by the ferromagnetic plates 21, eddy currents flow into the brake drum 13, which generates a braking torque. In a non-braking condition, the magnet support tube 19 is moved leftward in FIG. 5 by a rod 17a actuated, for example, by a fluid pressure actuator (not shown). With the magnet support tube 19 drawn outside the brake drum 13, the magnets 20 apply no magnetic field on the brake drum 13 which, therefore, generates no braking torque.

Figure 6:
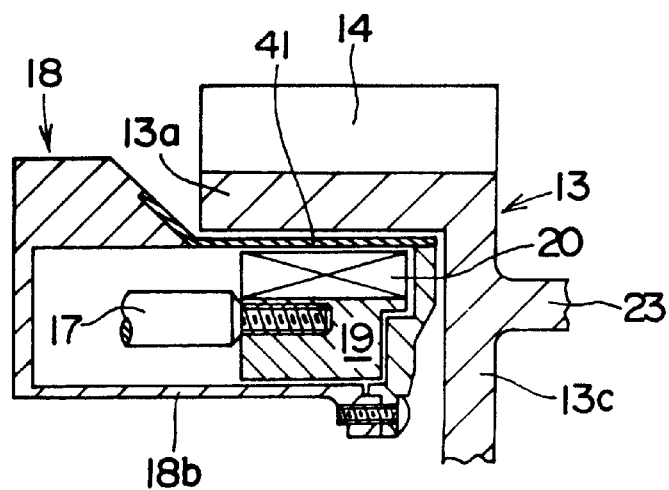
FIG. 6 is a side sectional view of a fifth embodiment of the invention.

In an embodiment shown in FIG. 6, a tube body 41 formed of a non-magnetically permeable sheet 41 replaces the ferromagnetic plates in the embodiment of FIG. 5. The sheet forms an outer peripheral wall portion of the guide tube 18 and is positioned closely adjacent to an inner peripheral surface of a brake drum 13. If a wall-thickness of the sheet tube body 41 is, for example, not more than 1 mm, the strength of magnetic fields applied to the brake drum 13 by the magnets 20 during braking is reduced only slightly from that provided by the embodiment in FIG. 5. Thus, when similarly operated, the embodiment of FIG. 6 exhibits similar braking performance.

Figure 7:
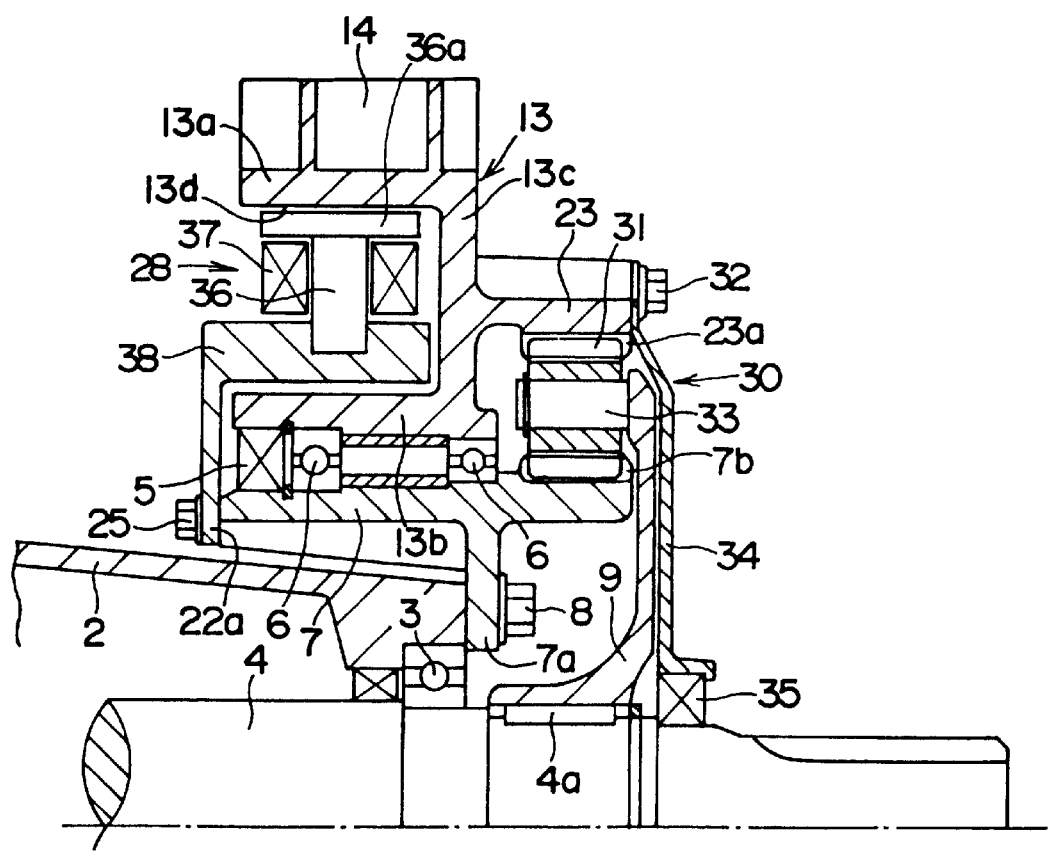
FIG. 7 is a side sectional view of a sixth embodiment of the invention.

An embodiment shown in FIG. 7 includes a brake drum 13 formed of magnetically permeable material and having a C-shape in section and a speed enhancing gear mechanism 30 rotatively coupling the brake drum 13 to a rotational drive shaft 4, a magnet support tube 38 is disposed within the brake drum 13, and a number of electromagnets 28 are supported at equal intervals on the outer peripheral surface of the magnet support tube 38. Each electromagnet 28 is formed by winding an electromagnetic coil 37 on a magnetic core 36 secured to the magnet support tube 38, and a magnetic-pole 36a of the magnetic core 36 is positioned to an inner peripheral surface 13d of an outer tube 13a of the brake drum 13. Other components of the FIG. 7 embodiment are similar to those of the embodiment shown in FIG. 1.

In a braking condition, the electromagnetic coils 37 are energized by an electrical source (not shown) to establish circumferentially alternating polarities for the magnetic-poles 36a. Consequently, magnetic circuits are produced between the magnet support tube 38 and the brake drum 13 which generates a braking torque. In a non-braking condition, energization of the electromagnetic coils 37 is interrupted.

Obviously, many modifications and variations of the present invention are possible in light of the above teachings. It is to be understood, therefore, that the invention can be practiced otherwise than as specifically described.

What is claimed is:

1. Vehicle braking apparatus comprising:
   a magnetically permeable, rotatably mounted brake drum having inner and outer surfaces;
   annularly distributed means for generating a magnetic field within said brake drum;
   control means for selectively controlling the application of said magnetic field to said brake drum;
   a drive shaft rotatable during movement of the vehicle; and
   coupling means for transmitting rotation of said drive shaft to said brake drum, said coupling means being adapted to produce a higher rotational speed for said brake drum than the simultaneous rotational speed of said drive shaft.

2. Braking apparatus according to claim 1 wherein said annularly distributed means comprises an array of annularly spaced apart permanent magnets.

3. Braking apparatus according to claim 2 wherein said control means comprises motive means for producing selective reciprocative movement of said annular array into and out of said brake drum.

4. Braking apparatus according to claim 3 including an array of annularly spaced apart magnetic pole pieces disposed between said array of permanent magnets and said inner surface of said brake drum.

5. Braking apparatus according to claim 3 including a tubular sheet of non-ferromagnetic material disposed between said array of permanent magnets and said inner surface of said brake drum.

6. Braking apparatus according to claim 2 including an array of annularly spaced apart magnetic pole pieces disposed between said array of permanent magnets and said inner surface of said brake drum.

7. Braking apparatus according to claim 6 wherein said control means comprises motive means for producing rotational movement of said array so as to selectively adjust the radial positions of said permanent magnets relative to said pole pieces.

8. Braking apparatus according to claim 7 wherein the total number of said permanent magnets equals the total number of said pole pieces, and said motive means alternately produces radial alignment and radial non-alignment between said permanent magnets and said pole pieces.

9. Braking apparatus according to claim 1 wherein said annularly distributed means comprises an array of annularly spaced apart electromagnets, and said control means comprises a voltage source for said electromagnets.

10. Braking apparatus according to claim 1 wherein said coupling comprises a gearing mechanism.

11. Braking apparatus according to claim 10 wherein said annularly distributed means comprises an array of annularly spaced apart permanent magnets.

12. Braking apparatus according to claim 11 wherein said control means comprises motive means for producing selective reciprocative movement of said annular array into and out of said brake drum.

13. Braking apparatus according to claim 12 including an array of annularly spaced apart magnetic pole pieces disposed between said array of permanent magnets and said inner surface of said brake drum.

14. Braking apparatus according to claim 12 including a tubular sheet of non-ferromagnetic material disposed between said array of permanent magnets and said inner surface of said brake drum.

15. Braking apparatus according to claim 11 including an array of annularly spaced apart magnetic pole pieces disposed between said array of permanent magnets and said inner surface of said brake drum.

16. Braking apparatus according to claim 15 wherein said control means comprises motive means for producing rotational movement of said array so as to selectively adjust the radial positions of said permanent magnets relative to said pole pieces.

17. Braking apparatus according to claim 16 wherein the total number of said permanent magnets equals the total number of said pole pieces, and said motive means alternately produces radial alignment and radial non-alignment between said permanent magnets and said pole pieces.

18. Braking apparatus according to claim 10 wherein said annularly distributed means comprises an array of annularly spaced apart electromagnets, and said control means comprises a voltage source for said electromagnets.

19. Braking apparatus according to claim 10 wherein said gearing mechanism comprises a fixed sun gear, a planetary gear engaged with said sun gear and fixed to said brake drum, and a ring gear engaged with said sun gear and fixed to said drive shaft.

20. Braking apparatus according to claim 19 wherein said annularly distributed means comprises an array of annularly spaced apart permanent magnets.

\* \* \* \* \*